United States Patent [19]

Davis

[11] Patent Number: 4,729,573

[45] Date of Patent: Mar. 8, 1988

[54] WHEELCHAIR LATCHING DEVICE

[76] Inventor: John W. Davis, Rte. 2, Box F, Rayville, La. 71269

[21] Appl. No.: 940,745

[22] Filed: Dec. 11, 1986

[51] Int. Cl.[4] .......................... B60N 1/02; B60P 3/06

[52] U.S. Cl. ...................... 280/289 WC; 297/DIG. 4; 410/7

[58] Field of Search ............... 280/289 WC, 242 WC; 297/DIG. 4; 4/480; 5/90; 410/7, 4, 3, 156

[56] References Cited

U.S. PATENT DOCUMENTS

| | | | |
|---|---|---|---|
| 2,592,405 | 4/1952 | Everest et al. | 297/DIG. 4 |
| 3,955,847 | 5/1976 | Schiowitz | 280/242 WC |
| 4,455,046 | 6/1984 | Linderoth | 297/DIG. 4 |
| 4,623,289 | 11/1986 | Apostolos | 410/7 |

*Primary Examiner*—Richard A. Bertsch
*Assistant Examiner*—Donn McGiehan
*Attorney, Agent, or Firm*—John M. Harrison

[57] ABSTRACT

A wheelchair latching device designed to connect a wheelchair to a commode, which latching device includes a latch mechanism mounted on the wheelchair and designed to engage a receiver mechanism secured to the floor and/or the commode. An axle component of the latch mechanism is designed to engage a pivoting latch tongue provided in the receiver mechanism to releasably secure the axle against a pair of spring-loaded tension receivers which are forced rearwardly in the receiver mechanism housing responsive to impact with the axle when the axle engages the latch tongue. The axle is thusly locked between the tension receivers and a lip provided on the latch tongue, and the seat of the wheelchair is thereby securely positioned immediately adjacent to the commode seat. Release of the wheelchair from close proximity to the commode is effected by hand-operation of a cable which activates a release provided in the latch mechanism and release the axle from engagement with the latch tongue and the tension receivers located in the receiver mechanism.

17 Claims, 6 Drawing Figures

WHEELCHAIR LATCHING DEVICE

BACKGROUND OF THE INVENTION

1. Cross-References to Related Applications

This application is copending with my U.S. patent application Ser. No. 06/940,741, filed Dec. 11, 1986 entitled "Commode" and U.S. patent application Ser. No. 06/940,746, entitled "Chair Bed".

2. Field of the Invention

This invention relates to a latching device for attaching a wheelchair or chair bed such as the chair bed disclosed in my copending U.S. patent application Ser. No. 06/940,746 to a conventional commode or to a specially designed commode such as the "Commode" disclosed in my other copending U.S. patent application Ser. No. 06/940,741, and more particularly, to a wheelchair latching device which is characterized by a latch mechanism fitted to the wheelchair and designed to engage a receiver mechanism mounted to the commode and or the bathroom floor, in order to releasably secure the wheelchair in close proximity to the commode. The wheelchair latching device is particularly useful and convenient for invalids who are unable to walk and ambulate from a wheelchair to a commode and back to the wheelchair without assistance. The latch mechanism component of the wheelchair latching device is equipped with a cable release which quickly and easily disengages the axle in the latch mechanism from the locking elements in the receiver mechanism in order to facilitate maneuvering of the wheelchair away from the commode.

One of the problems realized in the case of invalids who are confined to wheelcahirs is that of exiting the wheelchair, maneuvering onto a commode and subsequently relocating in the wheelchair. The problem is intensified because the wheelchair must be maneuvered directly toward the commode and then the occupant must not only stand, but also position his or her body in a 180° disposed relationship with respect to the wheelchair, in order to sit on the commode. This maneuver is frequently difficult or impossible in the case of invalids who are not ambulatory and these persons must generally be helped from the wheelchair onto the commode and back to the wheelchair. Although conventional wheelchairs are provided with wheel locks to prevent the wheelchair from rolling, the wheelchair may still slide with respect to the commode, thereby causing injury to the occupant. This hazard is particularly dangerous under circumstances where the bathroom floor is constructed of tile or is waxed.

Various devices are known in the art for assisting persons who are confined to wheelchairs in undertaking various ambulatory operations such as maneuvering from a wheelchair into a chair or bed or onto a commode and back into the wheelchair. A "Convertible Nursery Chair" is disclosed in U.S. Pat. No. 1,492,798, dated May 6, 1924, to C. Houston. The Convertible Nursery Chair is hygenic and comfortable to a child and is adapted and designed for training a child to use the bathroom at an early age. In a preferred embodiment the nursery chair includes a supporting frame, a seat frame and a back mounted on the supporting frame, each of which frames are adapted for adjustment at various angles with respect to the other. An apertured seat and a pivotally supported, pommel-like frame project above the seat frame and the nursery chair includes a projecting arm and a post mounted on the front of the seat frame with the arm movably supported by the post. U.S. Pat. No. 2, 299,640, dated Oct. 20, 1942, to J. B. Michon, discloses a "Bed Commode Chair". The bed commode chair of this invention includes a hinged frame with a commode seat attached thereto and a receptacle therein for use with a patient on a bed, in order to provide for normal body functions without having the patient vacate the bed. U.S. Pat. No. 4,199,829, dated Apr. 29, 1980, to Watanabe et, al., discloses a nursing system which is characterized by a wheelchair device having a number of forks supported at one end by side plates so as to constitute a backrest, seat and footrest. A transferring means having runway rails secured in preselected locations are also provided, along with a trolley adapted to travel along the rails. The trolley is designed to hold the patient in a carrier means in such a manner as to permit upward and downward movement of the carrier means. Nursing aids such as a toilet and bathtub are disposed within reach of the patient carrying means and a bed having multiple lands and furrows or alternately raised and sunken portions formed on the surface, correspond to the forks of the patient carrying means.

It is an object of this invention to provide a new and improved wheelchair latching mechanism which is designed to releasably and safely attach a wheelchair to a commode of substantially any design, in order to facilitate periodic, safe use of the commode by a person confined to the wheelchair.

Another object of this invention is to provide a new and improved latching device for attaching a wheelchair to a commode or to the bathroom floor near the commode and releasing the wheelchair from the commode or floor, in order to facilitate a means for non-ambulatory persons to safely move from the wheelchair to the commode and back to the wheelchair without assistance.

Still another object of this invention is to provide a latching mechanism for safely and releasably locating a wheelchair in close proximity to a commode, wherein when the latching device is used to lock the wheelchair in such close proximity to the commode, the seat of the wheelchair is positioned immediately adjacent the seat of the commode in order to facilitate safe and secure movement of the person from the wheelcahir to the commode and back to the wheelchair without assistance.

Yet another object of this invention is to provide a wheelchair latching device which includes two companion elements, a latch mechanism which is mounted to the wheelchair and a cooperatig receiver mechanism which is secured to the floor and/or the commode, whereby the latch mechanism automatically engages the receiver mechanism as the wheelchair approaches the commode to securely, but releasably lock the wheelchair in a position adjacent the commode and facilitate movement of a non-ambulatory person from the wheelchair to the commode and back to the wheelchair safety and without assistance.

SUMMARY OF THE INVENTION

These and other objects of the invention are provided in a new and improved latching device for securely locating a wheelcahir in close proximity to a commode, which latching device is characterized by a latch mechanism secured to the wheelchair and a cooperating received mechanism attached to the commode and/or mounted to the floor adjacent to the commode. Engaging components in the latch mechanism are designed to engage and lock to companion receiving elements in the receiver mechanism when the wheelchair approaches the commode, to securely align the seat of the wheelchair with the seat of the commode and facilitate movement of a non-ambulatory person from the wheelchair to the commode and back, without assistance. A cable release is provided in cooperation with the latch mechanism in order to disengage the axle in the latch mechanism from the locking elements in the receiver mechanism and facilitate movement of the wheelchair away from the commode.

BRIEF DESCRIPTION OF THE DRAWINGS

The invention will be better understood by reference to the accompanying drawings, wherein.

DESCRIPTION OF THE PREFERRED EMBODIMENTS

Figure 1:
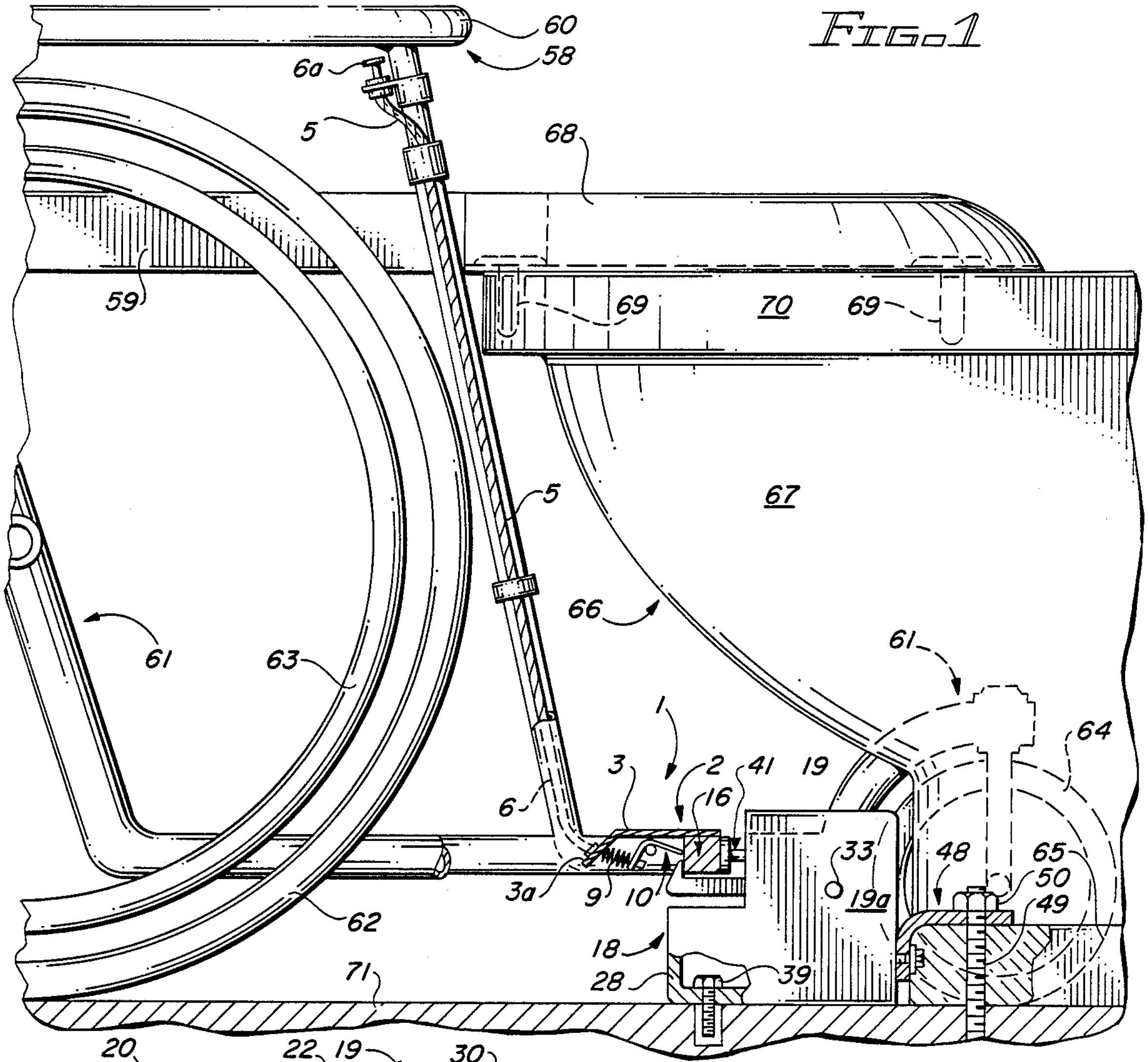
FIG. 1 is a side elevation, partially in section, of the wheelchair latching device with the wheelchair braces removed for clarity, the latch mechanism engaged and locked in the receiver mechanism and the wheelchair located in close proximity to the commode.
Figure 2:
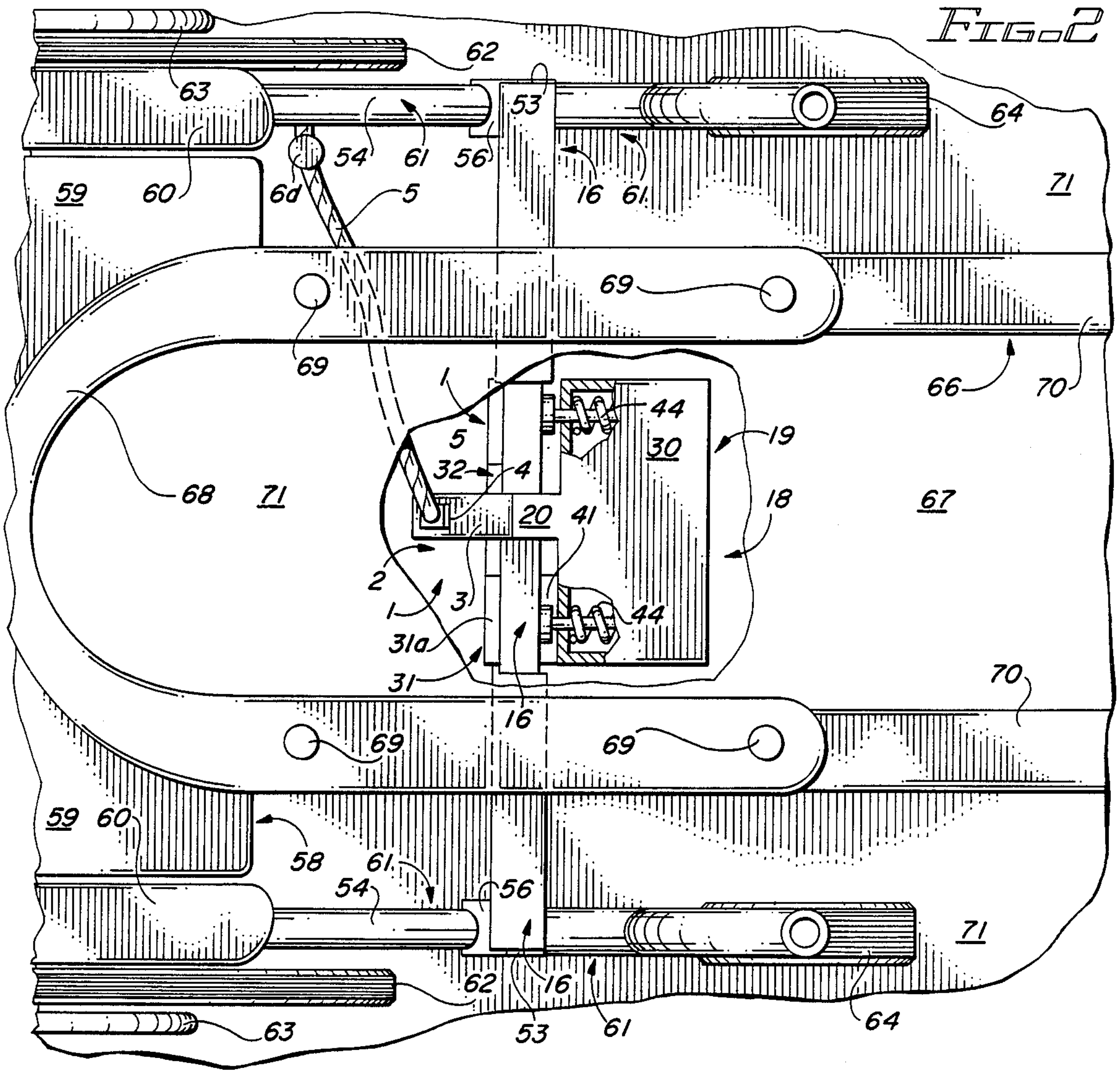
FIG. 2 is a top elevation, partially in section, of the wheelchair latching device illustrated in FIG. 1.

Referring initially to FIGS. 1 and 2 of the drawings, in a preferred embodiment the wheelchair latching device of this invention is generally illustrated by reference numeral 1. The wheelchair latching device 1 is characterized by a latch mechanism 2, which is secured to the frame 61 of a wheelchair 58 by means of a wheelchair brace 54 and an axle 16. The wheelchair 58 is conventional in design except for the curved wheelchair seat 59 and includes a frame 61, a seat 59 attached to the frame 61 and arm rests 60, also attached to the frame 61. Drive wheels 62 and pivoting front wheels 64 are mounted on the frame 61 and wheel grips 63, carried by the drive wheels 62, provide a means of propulsion of the wheelchair 58 by the occupant. The latch mechanism 2 is designed to engage a received mechanism 18, which is secured to the floor 71 and to the commode flange 65 of a commode 66. The commode 66 is further characterized by a bowl 67, a bowl rim 70 and a seat 68, which is removably secured to the bowl rim 70 by means of seat pins 69. The latch mechanism 2 is designed to disengage the receiver mechanism 18 by manipulation of a release pull **6*a*, which is attached to a cable 6 extending through a cable guide 5 to the latch mechanism 2**.

Figure 4:
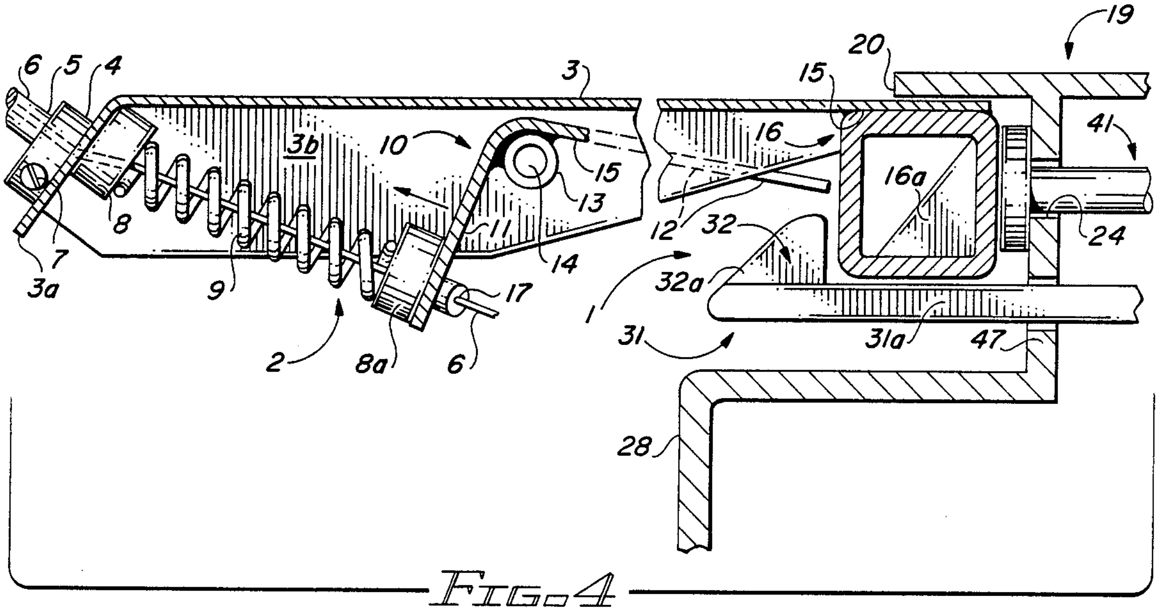
FIG. 4 is an enlarged sectional view of the latch mechanism engaging the locking elements of the receiver mechanism illustrated in FIG. 3.
Figure 5:
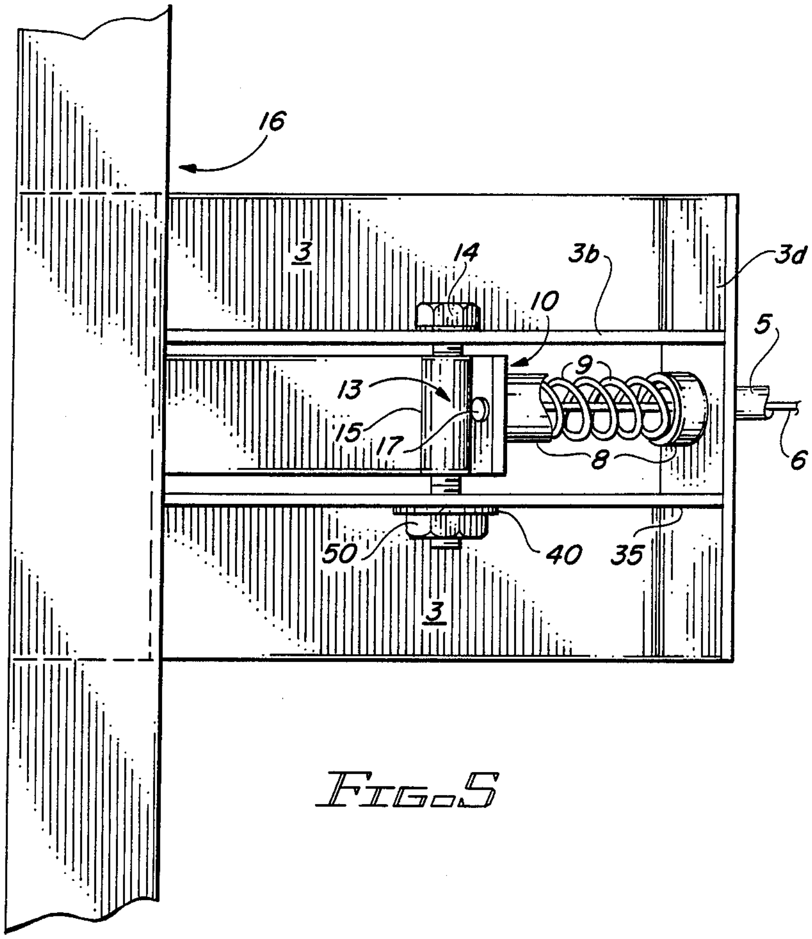
FIG. 5 is a bottom view of the latch mechanism illustrated in FIG. 4.

Referring now to FIGS. 4 and 5 of the drawings the latch mechanism 2 is more particularly characterized by a cable plate or mount 3, which is shaped to define a downwardly extending bracket end **3*a* and is fitted with parallel side flanges 3*b*, as illustrated. A cable clamp 4 is secured to the bracket end 3*a* of the cable 3 and serves to anchor one end of the cable guide 5 by means of a clamp screw 7, which is threaded in the cable clamp 4. The cable 6 extends through the cable guide 5 and the cable clamp 4 and through a first spring seat 8, which is securd to the bracket end 3*a* and a second spring seat 8*a*, secured to the spring leg 11 of a pivot plate 10. The extending end of the cable 6 is anchored to a cable stay 17, which seats against the spring leg 11 of the pivot plate 10. The L-shaped pivot plate 10 is shaped to define the spring leg 11 and a release leg 12 (illustrated partially in phantom) and is pivotally mounted on a pivot bolt 14 by means of a pivot sleeve 13. The pivot sleeve 13 is attached to the pivot plate 10 by means of a weld 15, located at the bend which joins the spring leg 11 and the release leg 12, as illustrated. As further illustrated in FIG. 5 of the drawings the pivot bolt 14 extends in rotatable fashion through the pivot sleeve 13 and is mounted in the bracket flanges 3*b* by means of a washer 40 and a nut 50. A plate spring 9 extends between the bracket end 3*a* of the cable mount 3 and the spring leg 11 of the pivot plate 10 and is seated in the facing spring seats 8 and 8*a*. The opposite end of the cable mount 3 from the bracket end 3*a* is secured to the axle 16 in perpendicular relationship by means of a weld 15 and in a preferred embodiment of the invention the axle 16 is provided with a bevel 16*a*** in the center portion thereof, for purposes which will be hereinafter more fully described.

Figure 3:
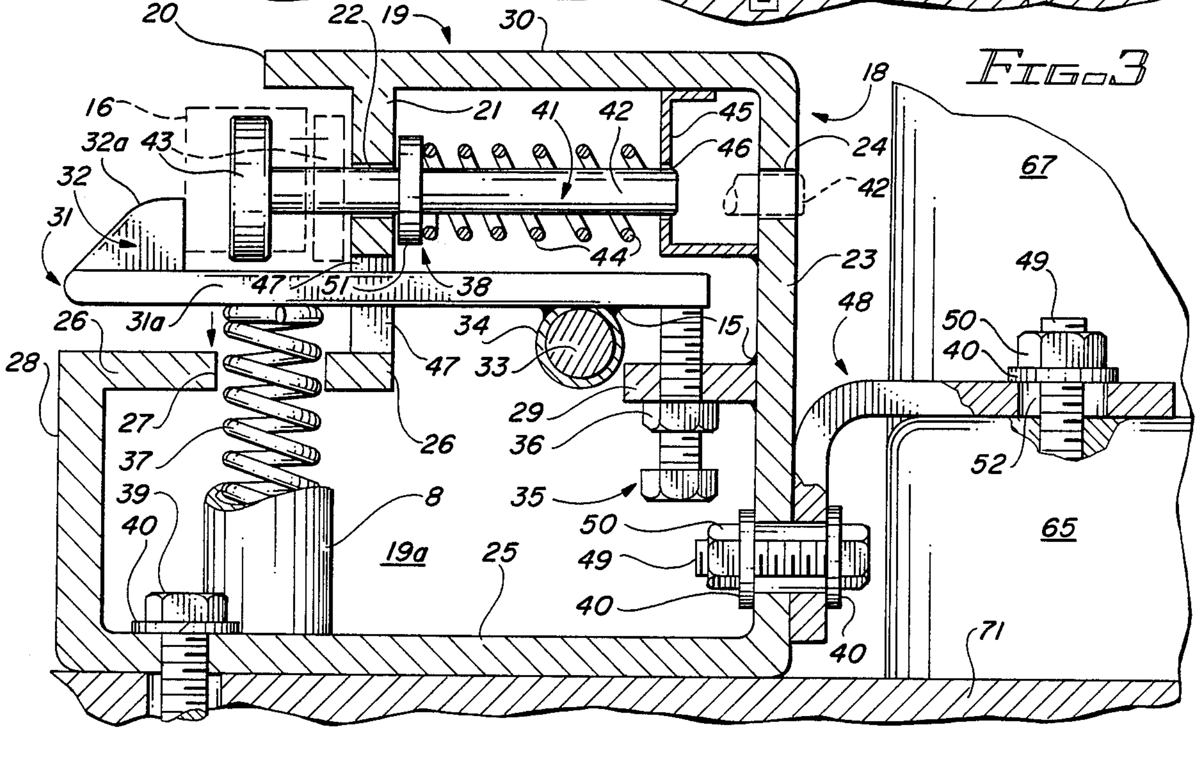
FIG. 3 is a side sectional view of the receiver mechanism bolted to the commode and to the floor.

Referring now to FIG. 3 of the drawings the receiver mechanism 18 is detailed and is characterized by a receiver housing 19, defined by sides **19*a*, a rear wall 23, a receiver top 30, a receiver base 25, which seats against the floor 71, a front wall 28, a spring wall 26 and a receiver wall 21. A safety plate 20 extends the receiver top 30 above a pair of spaced tension receivers 41, which are slidably disposed in spaced, parallel relationship in the receiver housing 19 beneath the receiver top 30 and the safety plate 20. Each of the tension receivers 41 is characterized by an elongated, round receiver shaft 42, which extends through one of two receiver openings 22 located in the receiver wall 21, and a receiver pad 43 attached to one end of the receiver shaft 42 and extending outwardly of the receiver wall 21. A latch tongue 31 projects from the receiver housing 19 beneath both of the tension receivers 41 and is characterized by an upward standing lip 32, having a tapered lip bevel 32*a* projecting from a flat latch tongue plate 31*a*, which extends through a latch tongue slot 47 provided in the receiver wall 21. The opposite end of the latch tongue 31*a* from the lip 32 is supported by a tongue adjustment bolt 35, which is threadably inserted in an adjustment bolt mount 29, secured to the rear wall 23 of the receiver housing 19 by means of a weld 15. A lock nut 36 serves to position the tongue adjustment bolt 35 in a selected position in the adjustment bolt mount 29 to adjust the tension in the latch tongue spring 37, as illustrated. The latch tongue plate 31*a* is attached by means of a weld 15 to a fulcrum 34 which receives a pivot bolt 33, extending through the sides 19*a* of the receiver housing 19, and threaded into one of the sides 19*a*, as illustrated in FIG. 1. The latch tongue 31 is pivotable on the pivot bolt 33 against the tension of a latch tongue spring 37, which projects through the spring wall opening 27 in the spring wall 26. The bottom end of the latch tongue spring 37 is seated in a spring seat 8*c*, which is mounted to the receiver base 25 and the upper end of the latch tongue spring 37 is secured against the latch tongue plate 31*a* by means of a spring retainer 38. The receiver base 25** of the receiver housing 19 is secured to the floor 71 by means of a mount bolt 39 and cooperating washer 40. Additional security for securing the receiver housing 19 is provided by means of a commode bracket 48, one leg of which is secured to the rear wall 23 of the receiver housing 19 by means of a bracket mount bolt 49 a cooperating nut 50 and a washer 40. The opposite leg of the commode bracket 48 is adjustably attached to the commode flange 65 by means of a second bracket mount bolt 49, a cooperating nut 50 and a washer 40, which bracket mount bolt 49 extends through an adjusting slot 52 provided in the commode bracket 48. A pair of rear wall openings 24 are provided in the rear wall 23 of the receiver housing 19 and are disposed in alignment with the receiver shafts 42 of the tension receivers 41, respectively. This orientation of the rear wall openings 24 facilitates reciprocation of the tension receivers 41 against the bias of a pair of receiver springs 44, mounted against dowel pins 51 projecting through the receiver shafts 42, respectively, and contained in the spring retainers 38, with the ends of the receiver shafts 42 projecting through the rear wall openings 24, as illustrated in phantom in FIG. 3. The opposite ends of the receiver springs 44 are seated against a receiver spring guide 45, provided with guide openings 46 which are aligned with the rear wall openings 24, to accomodate the receiver shafts 42 of the tension receivers 41, respectively.

Figure 6:
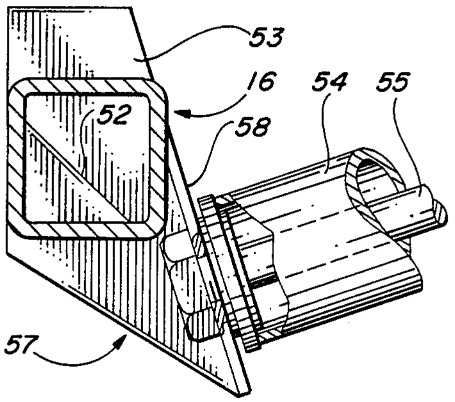
FIG. 6 is a sectional view of a preferred wheelchair bracket for mounting the axle component of the latch mechanism to the wheelchair.

Referring now to FIGS. 2 and 6 of the drawings in another most preferred embodiment of the invention the axle 16 is removably secured to the wheelchair brace 54 of the frame 61 of the wheelchair 58 by a pair of wheelchair brackets 57. Each of the wheelchair brackets 57 is characterized by an axle plate or bracket 53, which is welded or otherwise secured to one end of the axle 16 and an axle bracket flange 56, which is welded or otherwise secured to the axle bracket 53 in transverse relationship and receives one end of the wheelchair brace 54, as illustrated in FIG. 6. A brace bolt 55 is inserted longitudinally into the end of each of the wheelchair braces 54 and the axle bracket flange 56, in order to engage a conventional expansion clip (not illustrated) and removably secure the end of the wheelchair brace 54 on the axle bracket flange 56 and the axle 16 to the wheelchair brace 54.

In operation, referring again to FIGS. 1-4 of the drawings the wheelchair latching device of this invention is utilized as follows. The wheelchair 58 is initially aligned with the commode 66 and moved toward the commode 66 by application of hand and arm pressure on the wheel grips 63. As the wheelchair seat 59 approaches the commode seat 68, the bevel 16*a* of the axle 16 engages the lip bevel 32*a* of the lip 32 in the latch tongue 31 and this contact forces the latch tongue 31 downwardly against the bias of the latch tongue spring 37 as illustrated in FIG. 3. The force necessary to cause the latch tongue 31 to deflect downwardly responsive to contact with the axle 16 is determined by adjustment of the tongue adjustment bolt 35 and lock nut 36, which adjusts the tension in the latch tongue spring 37, as further illustrated in FIG. 3. Continued forward movement of the wheelchair 58 toward the commode 66 causes the axle 16 to traverse the lip 32 and seat against the receiver pads 43 of the tension receivers 41, wherein the tension receivers 41 are depressed against the bias of the receiver springs 44, also as illustrated in FIG. 3. The axle 16 finally locates and seats on the latch tongue plate 31*a* between the lip 32 of the latch tongue 31 and the receiver pads 43 of the spaced tension receivers 41, as illustrated in phantom in FIGS. 3 and 4. The wheelchair seat 59 is then secured immediately adjacent the commode seat 68, as illustrated in FIGS. 1 and 2 and the occupant of the wheelchair 58 can easily relocate from the wheelchair seat 59 to the commode seat 68 and back, without fear of the wheelchair 58 rolling or sliding away from the commode 66.

Referring now to FIGS. 1, 2 and 4 of the drawings, when it is desired to release the wheelchair 58 from the commode 66, the release pull 6*a* is grasped and pulled to apply tension on the cable 6. This action exerts a force against the spring leg 11 of the pivot plate 10 in the direction of the arrow, as illustrated in FIG. 4 and causes the projecting end of the release leg 12 to press downwardly against the lip 32 of the latch tongue 31. Continued upward pressure on the release pull 6*a* forces the latch tongue 31 downwardly against the bias of the latch tongue spring 37, as illustrated by the arrow in FIG. 3. When the axle 16 clears the lip 32 of the latch tongue 31, the bias of the receiver springs 44 and the resulting pressure of the receiver pads 43 of the tension receivers 41 against the axle 16 then forces the axle 16 away from the receiver mechanism 18 and releases the wheelchair 58 from the commode 66.

Referring again to FIGS. 1 and 3 of the drawings, it will be appreciated that the proximity of the wheelchair seat 59 to the commode seat 68 can be adjusted by adjusting the commode bracket 48 with respect to the commode flange 65. This adjustment is facilitated by the adjusting slot 52 provided on the commode bracket 48 and allows the receiver mechanism 18 to be adjusted with respect to the commode flange 65. Furthermore, a conventional wheelchair not provided with a curved wheelchair seat 59 can be fitted with the latch mechanism 2 and located immediately adjacent a commode seat 68 which is modified to accommodate the straight front edge of the wheelchair seat 59, according to the knowlege of those skilled in the art.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A wheelchair latching device for releasably locking a wheelchair into close proximity to a commode, said wheelchair latching device comprising axle means carried by the frame of said wheelchair and release means carried by said axle means, a housing secured in close proximity to the commode and latch tongue means pivotally carried by said housing, said axle means adapted to engage said latch tongue means in locking relationship and substantially immobilize the wheelchair with respect to the commode responsive to movement of the wheelchair in said close proximity to the commode and disengage said latch tongue means, responsive to manipulation of said release means.

2. The wheelchair latching device of claim 1 further comprising at least one tension receiver slidably mounted in said housing and tension receiver bias means seated in said housing and engaging said tension receiver, whereby said tension receiver is contacted by said axle means and is forced rearwardly into said housing against said tension receiver bias means when said axle means engages said latch tongue means.

3. The wheelchair latching device of claim 1 wherein said axle means is further characterized by a cable mount and an axle secured to one end of said cable mount in transverse relationship and said release means is pivotally attached to said cable mount.

4. The wheelchair latching device of claim 1 wherein said axle means is further characterized by a cable mount and an axle secured to one end of said cable mount in transverse relationship and said release means is pivotally attached to said cable mount, and further comprising at least one tension receiver slidably mounted in said housing and tension receiver bias means seated in said housing and engaging said tension receiver, whereby said tension receiver is contacted by said axle and is forced rearwardly into said housing against said tension receiver bias means when said alxe engages said latch tongue means.

5. The wheelchair latching device of claim 4 wherein said release means further comprises a generally L-shaped pivot plate pivotally carried by said cable mount, with one end of said pivot plate located in close proximity to said latch tongue means; a cable secured to the opposite end of said pivot plate, said cable extending through said cable mount to the wheelchair; and a plate spring positioned between said opposite end of said pivot plate and said cable mount for normally biasing said one end of said pivot plate away from said latch tongue means, whereby said axle is released from said latch tongue means by pressure exerted on said axle by said tension receiver responsive to tensioning of said cable and downward urging of said latch tongue means by said one end of said pivot plate.

6. A wheelchair latching device for removably securing a wheelchair to a commode, said wheelchair latching device comprising a latch mechanism carried by the wheelchair, said latch mechanism characterized by axle means secured to the wheelchair frame and release means pivotally carried by said axle means, and a receiver mechanism carried by the commode, said receiver mechanism characterized by a housing and latch tongue means pivotally mounted in said housing, whereby when said axle means engages said latch tongue means the wheelchair is locked in close proximity to the commode and said axle means is released from said latch tongue means responsive to manipulation of said release means.

7. The wheelchair latching device of claim 6 wherein said axle means further comprises a cable mount; an axle secured to one end of said cable mount for engaging said latch tongue means; and a plate spring located between said cable mount and said release means, whereby said release means is biased in spaced relationship with respect to said latch tongue means when said axle is locked in engagement with said latch tongue means.

8. The wheelchair latching device of claim 6 wherein said latch tongue means further comprises a latch tongue plate pivotally mounted in said housing and a lip projecting from said latch tongue plate for engaging said axle means when said axle means is locked in said receiver mechanism and further comprising a latch tongue spring provided in said housing, said latch tongue spring engaging said latch tongue plate and biasing said latch tongue plate against said axle means for securing said axle means against said latch tongue plate.

9. The wheelchair latching device of claim 6 wherein:

(a) said axle means further comprises a cable mount; an axle secured to one end of said cable mount for engaging said latch tongue means; and a plate spring provided between said cable mount and said release means for biasing said release means away from said latch tongue means; and (b) said latch tongue means further comprises a latch tongue plate pivotally mounted in said housing and a lip projecting from said latch tongue plate for engaging said axle when said axle is locked in said receiver mechanism and further comprising a latch tongue spring provided in said housing, said latch tongue spring engaging said latch tongue plate and biasing said latch tongue plate against said axle for securing said axle against said latch tongue plate.

10. The wheelchair latching device of claim 9 further comprising at least one tension receiver means slidably mounted in said housing in close proximity to said latch tongue plate and bias means provided in said housing, said bias means engaging said tension receiver means and biasing said tension receiver means outwardly of said housing, whereby when said axle engages said latch tongue plate and said lip, said axle engages said tension receiver means and forces said tension receiver means rearwardly into said housing against said bias means.

11. The wheelchair latching device of claim 9 wherein said release means further comprises a generally L-shaped pivot plate pivotally mounted to said cable mount, with one end of said pivot plate extending in close proximity to said latch tongue lip; a plate spring positioned between the opposite end of said pivot plate and said cable mount for biasing said one end of said pivot plate in said close proximity to said latch tongue lip; and a cable extending from said opposite end of said pivot plate through said plate spring and said cable mount to the wheelchair, whereby said one end of said pivot plate engages said latch tongue lip and forces said latch tongue plate downward against the bias of said plate spring to release said axle from said housing responsive to tension applied to said cable.

12. The wheelchair latching device of claim 9 wherein said release means further comprises a generally L-shaped pivot plate pivotally mounted to said cable mount, with one end of said pivot plate extending in close proximity to said latch tongue lip; a plate spring positioned between the opposite end of said pivot plate and said cable mount for biasing said one end of said pivot plate in said close proximity to said latch tongue lip; and a cable extending from the opposite end of said pivot plate through said plate spring and said cable mount to the wheelchair, whereby said one end of said pivot plate engages said latch tongue lip and forces said latch tongue plate downward against the bias of said plate spring to release said axle from said housing responsive to tension applied to said cable and further comprising at least one tension receiver means slidably mounted in said housing in close proximity to said latch tongue plate and bias means provided in said housing, said bias means engaging said tension receiver means and biasing said tension receiver means outwardly of said housing, whereby when said axle engages said latch tongue plate and said lip, said axle engages said tension receiver means and forces said tension receiver means rearwardly into said housing against said bias means.

13. A wheelchair latching device for removably securing a wheelchair to a commode, said wheelchair latching device comprising a latch mechanism carried by the wheelchair, said latch mechanism characterized by an axle carried by the wheelchair; a cable mount having one end fixedly attached to said axle; release means pivotally carried by said cable mount for releasing the wheelchair from the commode; and a receiver mechanism adjustably secured to the commode, said receiver mechanism characterized by a housing, a latch tongue plate pivotally mounted in said housing, said latch tongue plate located in a plane which is below the plane of said axle; a lip projecting from said latch tongue plate, said lip oriented in substantially horizontal alignment with said axle; and a latch tongue spring provided in said housing and engaging said latch tongue plate for biasing said latch tongue plate upwardly against said axle and locking said axle against said latch tongue plate when said wheelchair is located in close proximity to said commode.

14. The wheelchair latching device of claim 13 further comprising at least one tension receiver means slidably mounted in said housing in close proximity to said latch tongue and bias means provided in said housing, said bias means engaging said tension receiver means and biasing said tension receiver means outwardly of said housing, whereby when said axle engages said latch tongue plate and said lip, said axle engages said tension receiver means and forces said tension receiver means rearwardly into said housing against said bias means.

15. The wheelchair latching device of claim 13 wherein said release means further comprises a generally L-shaped pivot plate pivotally mounted to said cable mount, with one end of said pivot plate extending in close proximity to said latch tongue lip; a plate spring positioned between the opposite end of said pivot plate and said cable mount for biasing said one end of said pivot plate in said close proximity to said latch tongue lip; and a cable extending from said opposite end of said pivot plate through said plate spring and said cable mount to the wheelchair, whereby said one end of said pivot plate engages said latch tongue lip and forces said latch tongue plate downward against the bias of said plate spring to release said axle from said housing responsive to tension applied to said cable.

16. The wheelchair latching device of claim 13 further comprising at least one tension receiver means slidably mounted in said housing in close proximity to said latch tongue and bias means provided in said housing, said bias means engaging said tension receiver means and biasing said tension receiver means outwardly of said housing, whereby when said axle engages said latch tongue plate and said lip, said axle engages said tension receiver means and forces said tension receiver means rearwardly into said housing against said bias means, and wherein said release means further comprises a generally L-shaped pivot plate pivotally mounted to said cable mount, with one end of said pivot plate extending in close proximity to said latch tongue lip; a plate spring positioned between the opposite end of said pivot plate and said cable mount for biasing said one end of said pivot plate in said close proximity to said latch tongue lip; and a cable extending from said opposite end of said pivot plate through said plate spring and said cable mount to the wheelchair, whereby said one end of said pivot plate engages said latch tongue lip and forces said latch tongue plate downward against the bias of said plate spring to release said axle from said housing responsive to tension applied to said cable.

17. The wheelchair latching device of claim 16 wherein said at least one tension receiver means is a pair of tension receiver means provided in spaced, slidable relationship in said housing and said bias means is a pair of receiver springs engaging said tension receiver means in said housing, respectively.

* * * * *